US005661899A

United States Patent [19]

Ayres

[11] Patent Number: 5,661,899

[45] Date of Patent: Sep. 2, 1997

[54] CLIP CLAMPING MACHINE

[76] Inventor: Donald B. Ayres, 8501 Laramie, Skokie, Ill. 60077

[21] Appl. No.: 539,442

[22] Filed: Oct. 5, 1995

[51] Int. Cl.$^{6}$ .................... B23Q 7/10

[52] U.S. Cl. .................... 29/810; 29/816; 29/818; 29/243.56; 72/409.03; 72/409.04

[58] Field of Search .................... 29/91, 91.1, 810, 29/816, 818, 243.56, 268; 140/3 CA, 11, 93 D, 106; 72/409.02, 409.03, 409.04, 409.13

[56] References Cited

U.S. PATENT DOCUMENTS

| | | | |
|---|---|---|---|
| 1,812,747 | 6/1931 | Jorgensen | 29/268 |
| 1,963,306 | 6/1934 | Maynard | 140/93 D |
| 2,312,027 | 2/1943 | Carlson | 72/409.02 |
| 2,453,872 | 11/1948 | Stauffer | 72/409.04 |
| 2,574,811 | 11/1951 | Blumensaadt | 29/818 |
| 3,279,046 | 10/1966 | Shapiro | 29/243.56 |
| 3,526,944 | 9/1970 | Cherup | 29/816 |
| 3,851,371 | 12/1974 | Plunkett | 29/243.56 |
| 4,198,738 | 4/1980 | Wallace | 29/268 |
| 4,224,731 | 9/1980 | Lingle . | |
| 4,546,528 | 10/1985 | Langas . | |
| 4,724,590 | 2/1988 | Langas et al. . | |
| 4,815,182 | 3/1989 | Langas et al. . | |
| 4,829,643 | 5/1989 | Ayres et al. . | |

*Primary Examiner*—David P. Bryant
*Attorney, Agent, or Firm*—Thomas R. Vigil

[57] ABSTRACT

The clip clamping machine comprises a clip dispensing and clamping mechanism, a pneumatic piston and cylinder mechanism mounted to one end of the clip dispensing and clamping mechanism, a magazine track mounted to the other end of the clip dispensing and clamping mechanism and a pusher member in the magazine track. The magazine track is made of thermoplastic material to reduce the weight of the machine. Likewise, the pusher member is a one piece plastic pusher member. A lower end of the magazine track has a boss extending outwardly therefrom and having a through-bore which receives a bolt that also extends through side-walls of a housing of the clip dispensing and clamping mechanism and through bifurcated arms of a stationary anvil mounted to the housing.

3 Claims, 4 Drawing Sheets

CLIP CLAMPING MACHINE

BACKGROUND OF THE INVENTION

1. Field of the Invention

The present invention relates to an improved clip clamping machine having improved structural features including light weight plastic parts for use in clamping clips to border wires and mattress innersprings or between the innersprings themselves.

2. Description of the related art including information disclosed under 37 CFR §§1.97–1.99

Heretofore various methods and apparatus have been proposed for clamping metal clips between border wires and mattress innersprings. Examples of these machines are disclosed in the following U.S. patents:

| U.S. Pat. No. | Patentee |
|---|---|
| 4,224,731 | Lingle |
| 4,724,590 | Langas et al. |
| 4,815,182 | Langas et al. |
| 4,829,643 | Ayres et al. |

Further, it has been proposed in the Langas et al. U.S. Pat. No. 4,546,528 to provide a free standing apparatus including a clip clinching tool. In this patent, there is disclosed a clip clinching tool supported from overhead by a hanger and a suspension bracket and is fed from a clip roll dispenser with a line of clips that feed into a clip track associated with the clip clinching tool.

An improvement over the clip clinching tool disclosed in the Langas U.S. Pat. No. 4,546,528 is a clip clinching tool which has a self-contained arcuate magazine track containing a line of clips bound together by at least one metal wire which is cut when the tool is actuated to dispense a clip and clinch or clamp the clip around adjacent wires in an innerspring assembly.

As will be described in greater detail hereinafter, the machine of the present invention is an improvement over the machine just described by providing in a clip clamping machine an arcuate light weight plastic magazine track, a stress bearing pivot connection of the track to a clip clamping mechanism of the machine, a simple connection of a pneumatic piston and cylinder mechanism the track, a one piece light weight plastic pusher mounted in the track, a relatively constant spring pressure return spring in the pneumatic piston and cylinder mechanism, and two pairs of opposed spaced apart figure B shaped holes in opposed housing sidewalls for establishing two mounting positions for a guide structure for a driver blade of the clip clamping machine.

SUMMARY OF THE INVENTION

According to the present invention there is provided in a clip clamping machine comprising a clip dispensing and clamping mechanism, a pneumatic piston and cylinder mechanism mounted to a first end of the clip dispensing and clamping mechanism, a magazine track mounted to a second end of the clip dispensing and clamping mechanism and a pusher member in the magazine track, the improvement residing in: the pusher member being a one piece plastic pusher member and including (a) a generally rectangular body that is received in a U-shaped trough of the magazine track, (b) a flange extending laterally from the body and a cage structure mounted to the flange and disposed above one side flange of the magazine track for receiving one end of a coiled spring, and the generally rectangular body having a cavity therein adjacent a front end thereof for receiving a magnet for holding the last clip in a line of clips received in the U-shaped trough of the magazine track.

Also according to the present invention there is provided in a clip clamping machine comprising a clip dispensing and clamping mechanism, a pneumatic piston and cylinder mechanism mounted to a first end of the clip dispensing and clamping mechanism, a magazine track mounted to a second end of the clip dispensing and clamping mechanism and a pusher member in the magazine track, the improvement residing in: the pusher member being a one piece plastic pusher member and including (a) a generally rectangular body that is received in a U-shaped trough of the magazine track, (b) a flange extending laterally from the body and a cage structure mounted to the flange and disposed above one side flange of the magazine track for receiving one end of a coiled spring, and the generally rectangular body having a slot for receiving a spring biased detent member which has a detent that is releasably received in an opening in a bottom wall of the U-shaped trough of the magazine track.

Further according to the present invention there is provided in a clip clamping machine comprising a clip dispensing and clamping mechanism including a housing having two elongate spaced apart sidewalls, a pneumatic piston and cylinder mechanism mounted to a first end of the clip dispensing and clamping mechanism, a magazine track mounted to a second end of the clip dispensing and clamping mechanism a pusher member in the magazine track, and a driver blade mounted for reciprocating movement transversely of a path of movement clips in the clip clamping machine, the improvement residing in: the sidewalls of the housing each having a pair of spaced apart figure B shaped mounting openings, each figure B shaped opening being aligned with a figure B shaped opening in the opposed sidewall for providing two mounting positions for a guide structure for the driver blade.

DESCRIPTION OF THE PREFERRED EMBODIMENT(S)

Figure 1:
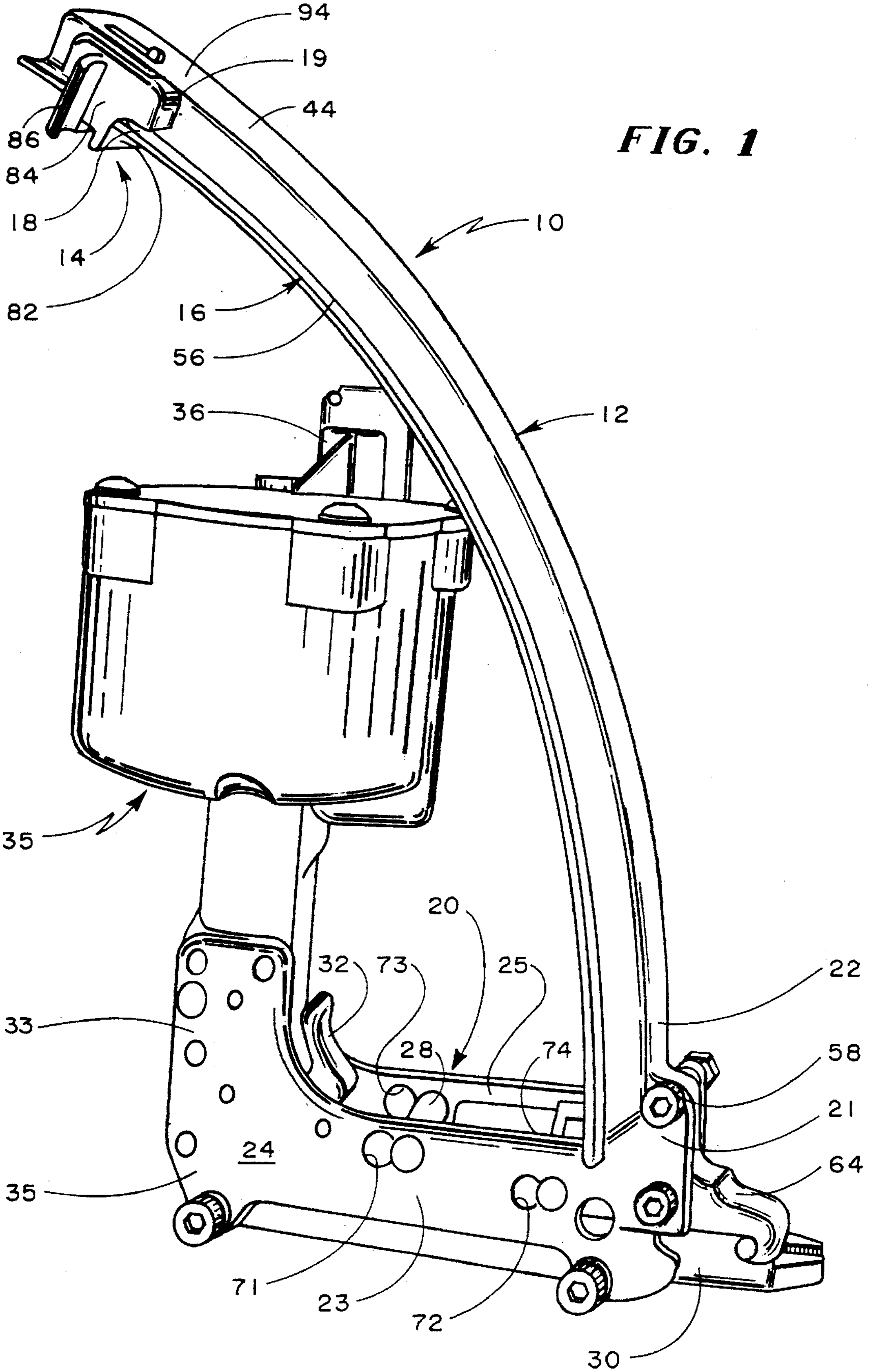
FIG. 1 is a side perspective view of the clip clamping machine including a plastic, clip receiving, magazine track constructed according to the teachings of the present invention.
Figure 2:
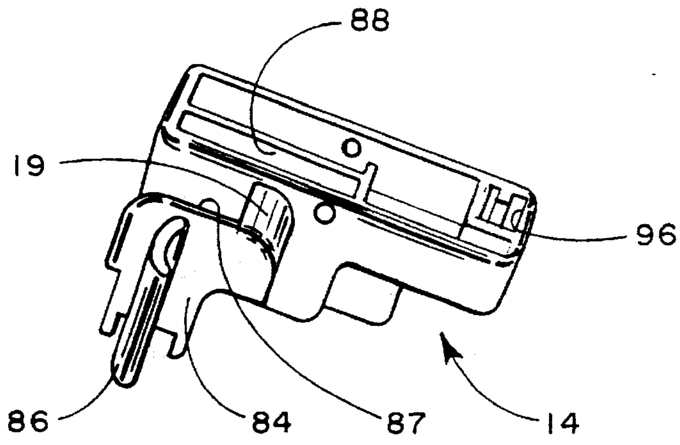
FIG. 2 is a perspective view of a one piece pusher member which is received in the track shown in FIG. 1.
Figure 3:
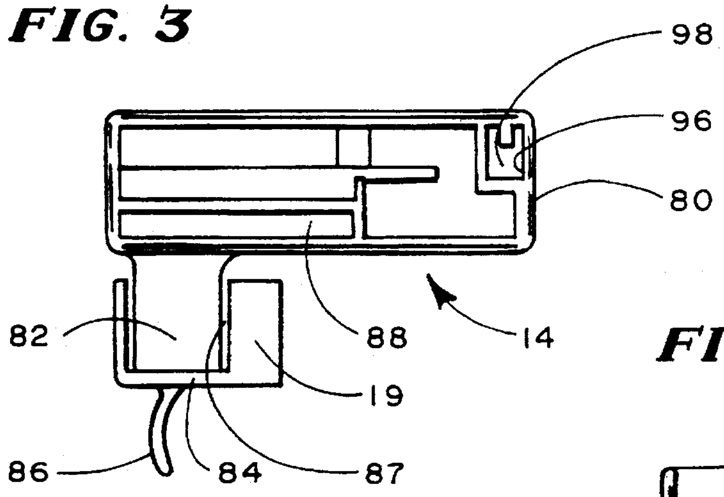
FIG. 3 is a bottom plan view of the pusher member shown in FIG. 2 using the inside bottom wall of a U shaped trough of the magazine track as a point of reference.
Figure 4:
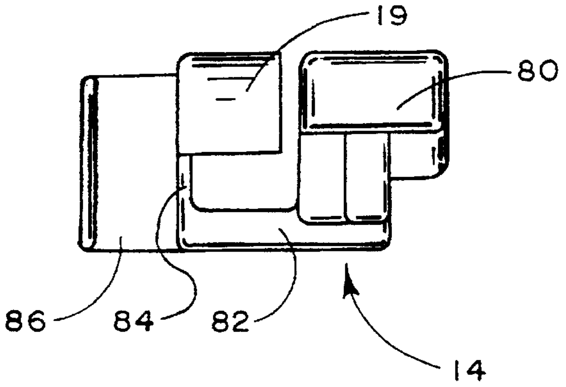
FIG. 4 is an outer end view of the pusher member shown in FIG. 2.
Figure 5:
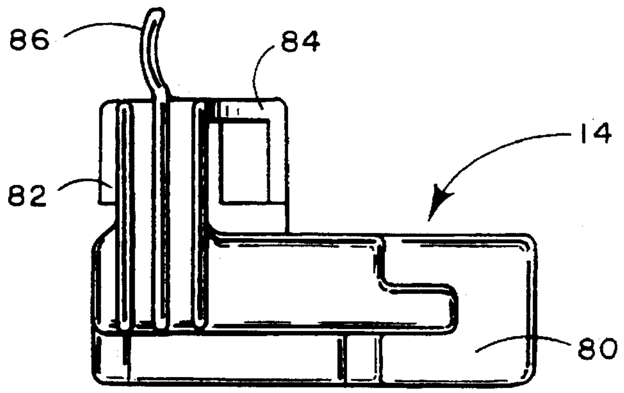
FIG. 5 is an top plan view of the pusher member shown in FIG. 4.
Figure 6:
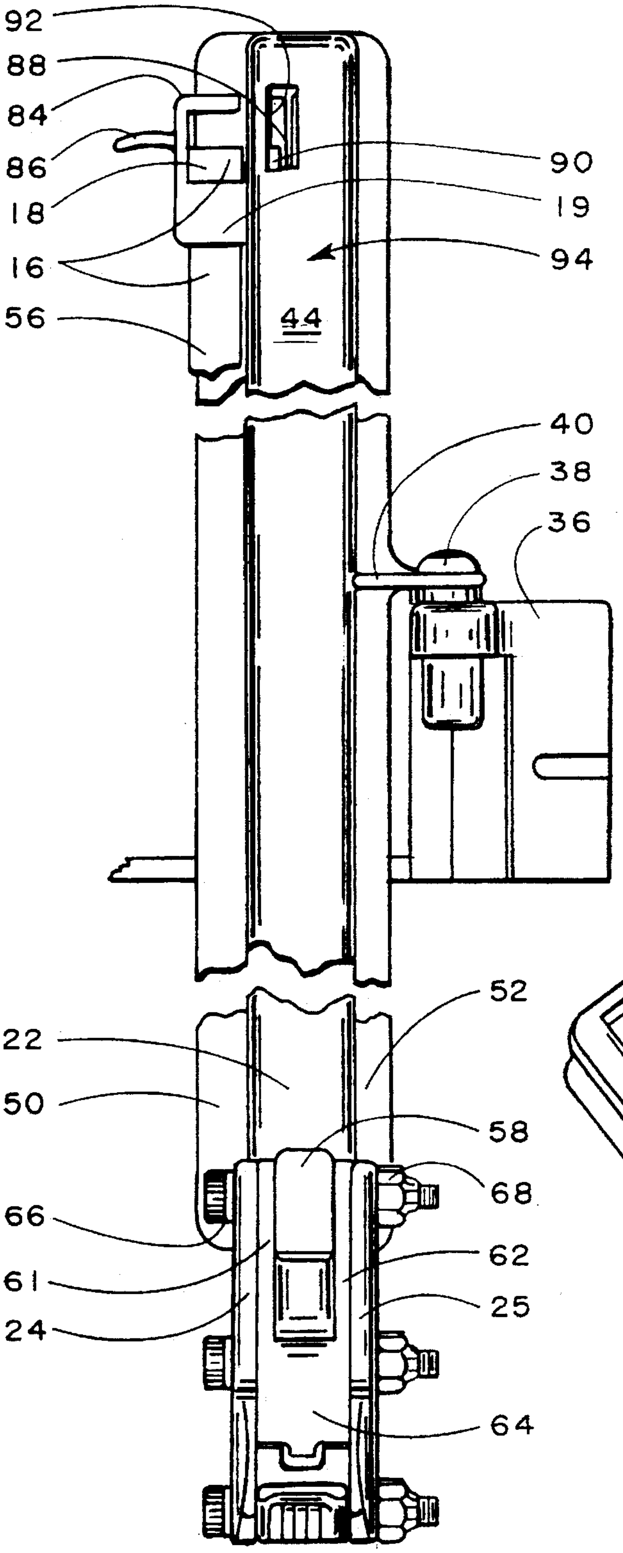
FIG. 6 is an inner end elevational view of the one piece pusher member shown in FIG. 1 with portions broken away.

Referring now to the drawings in greater detail, there is illustrated in FIG. 1 a clip clamping machine 10 constructed according to the teachings of the present invention and including an arcuate plastic magazine track 12 which receives therein a line of clips which can be connected together by one or two non-metal wires as disclosed in the Ayres U.S. Pat. No. 5,303,821, a one piece plastic pusher member 14 mounted in the track 12 and connected to a coil spring 16 (FIG. 6) having a coiled end 18 (FIG. 6) received in a cage structure 19 of the pusher member 14, and an elongate L-shaped clip dispensing and clamping mechanism 20 having one end 21 mounted to a lower end 22 of the magazine track 12.

The clip dispensing and clamping mechanism 20 includes an L-shaped housing 23 comprising spaced apart sidewalls 24 and 25, an operating mechanism hidden from view and including a driver blade guide structure 28, and a driver blade 30 operated by a trigger 32 which is mounted adjacent a leg 33 of the housing 23 at the other end 34 of the clip dispensing and clamping mechanism 20.

A pneumatic piston and cylinder mechanism 35 including a conventional valve mechanism is connected to the upper end of the leg 33 of the L-shaped housing 23. An upper end bracket 36 of the pneumatic piston and cylinder mechanism 35 is mounted by two bolts 38 to a bracket 40 which extends outwardly from the arcuate magazine track 12.

Figure 7:
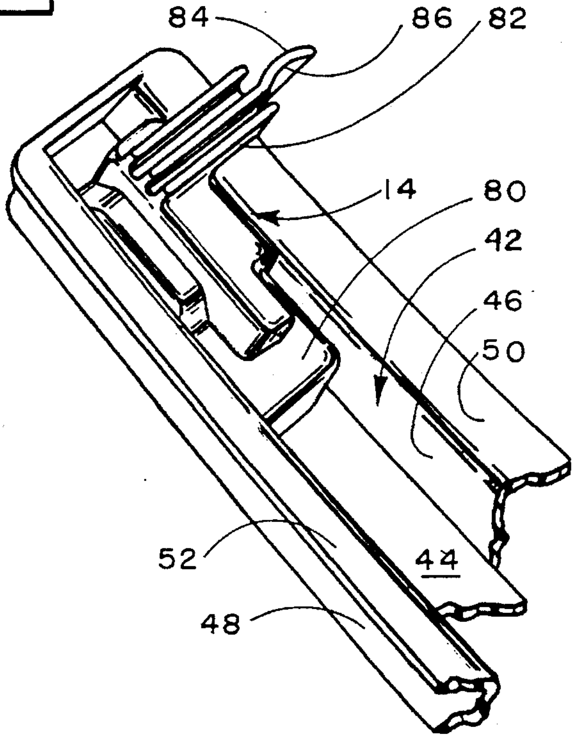
FIG. 7 is an upward view of the upper end of the track showing the one piece pusher member mounted in the track.

As best shown in FIG. 7, the arcuate plastic magazine track 12 has a generally U or channel shaped trough 42 including a bottom wall 44 opposite sidewalls 46 and 48 each having a laterally extending side flange 50 and 52 extending from each side of the track 12. The arcuate side flange 50 is wider than the opposite arcuate side flange 52 and has mounted thereon an uncoiled portion 56 of the coil spring 16.

At the lower end 22 of the U-shaped track 12 is an outwardly extending boss 58 (FIGS. 1 and 6) having a throughbore extending laterally therethrough which is received between bifurcated legs 61 and 62 a stationary anvil 64 forming part of the clip dispensing and clamping mechanism 20. The stationary anvil 64 is mounted between the two sidewalls 24 and 25 of the housing 23 by a bolt 66 and a nut 68 which extends first through one sidewall 24, one leg 61 of the stationary anvil 64, the boss 58, the other leg 62 of the stationary anvil 64, and through the other sidewall 25 of the housing 23 where the nut 68 is secured to the bolt 66.

As shown, each sidewall 24, 25 of the housing 23 has two spaced apart figure B shaped holes 71, 72 or 73,74 aligned with similar holes 73, 74 or 71, 72 in the other sidewall 25 of the housing 23 for mounting the guide structure 28 for guiding the driver blade 30 in one of two different positions.

Referring now to FIGS. 2–5 and 7, the pusher member 14 is of one piece construction and includes a generally rectangular body or block portion 80 that is received within the U-shaped trough 42 of the arcuate magazine track 12. Then, a flange 82 extends from the body 80 laterally of the magazine track 12 outwardly to an arm 84 which extends upwardly to the cage structure 19 and has a handle or finger gripping portion 86 extending from and alongside the cage structure 19 for enabling one to grip the pusher member 14. The cage structure 19 fits over the wider side flange 50 and is open at 87 for receiving the coiled end 18 of the coil spring 16.

Also, a slot 88 (FIG. 2) is provided in the body 80 for receiving a spring biased detent 90 which is adapted to extend upwardly through an elongate hole 92 (FIG. 6) that extends through bottom wall 44 of the inverted U-shaped trough 42 in the track 12 for releasably holding the spring bias detent 90 to hold the pusher member 14 at the outer end 94 of the magazine track 12.

The body 80 has a cavity 96 therein adjacent a front wall 98 thereof which is positioned adjacent the last clip in a line of clips. A magnet 98 is positioned within the cavity 96 for holding the last clip in the line of clips against the pusher member 14 before the last clip is fastened to wires in an innerspring assembly.

Figure 8:
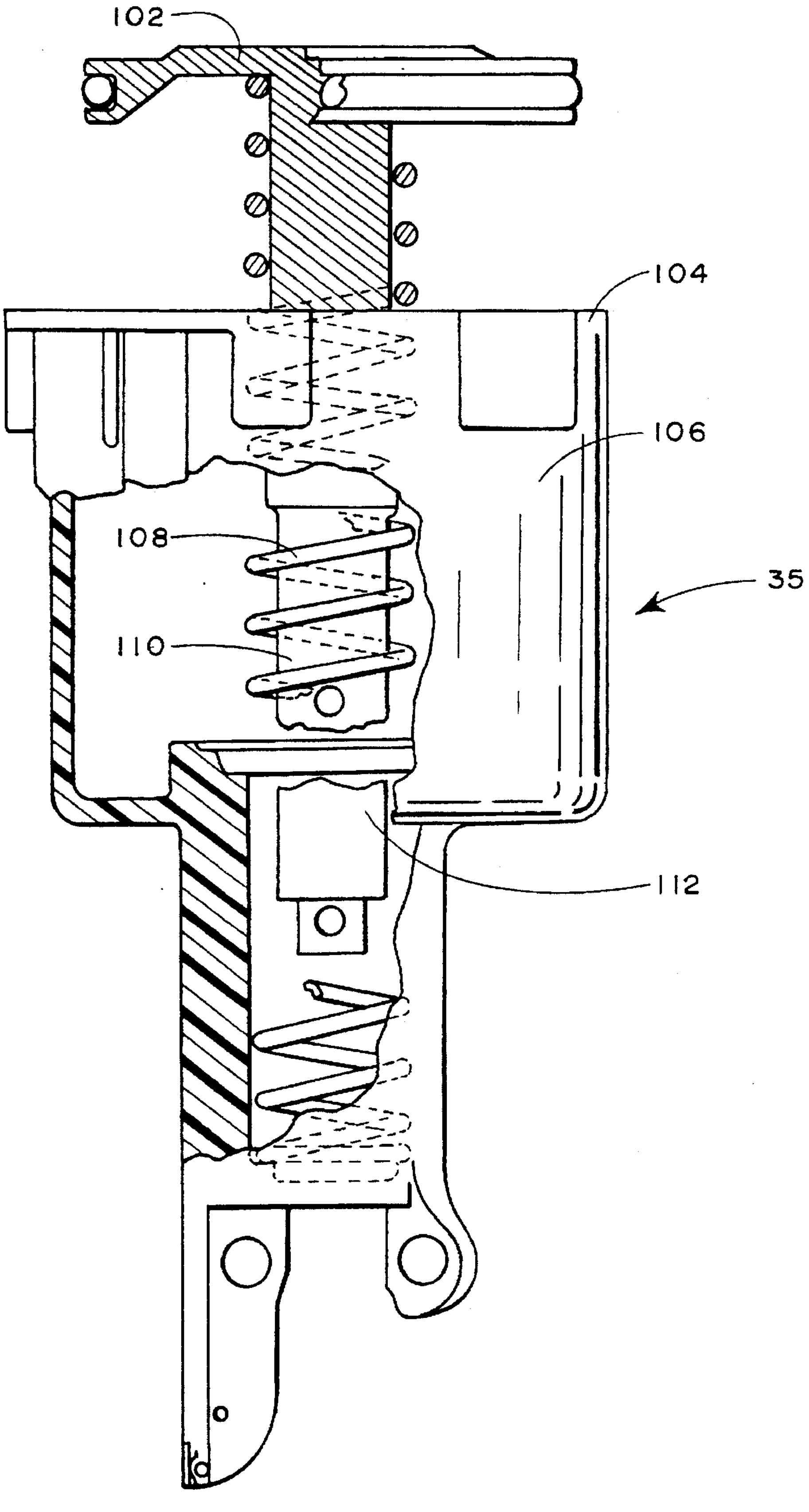
FIG. 8 is a partially exploded, partially sectional view of a pneumatically operated piston, a piston rod and a return spring mounted around the piston rod within a pneumatic piston and cylinder mechanism of the clip clamping machine shown in FIG. 1.

Referring now to FIG. 8, there is illustrated therein a partially cut-away view of the pneumatic piston and cylinder mechanism 35 showing a piston 102 extended from a top 104 of a cylinder 106 of the piston and cylinder mechanism 35 and showing a coiled return spring 108 around a piston rod 110 of the piston and cylinder mechanism 35 which has a lower end 112 that extends downwardly for engaging the operating mechanism within the housing 23. According to the teachings of the present invention, the piston 102 and piston rod 110 are integral with each other and of a one piece construction. The use of the return spring 108 having a constant spring force K, which is relatively constant over the life of the clip clamping machine 10, eliminates the need for a double acting valve system and the replacement of O-rings on the piston rod 110 when they wear out, as occurred in prior art clip clinching machines with resulting down time.

The improved clamping machine 10 of the present invention has a number of advantages, some of which have been described above and others of which are inherent in the invention.

For example, the provision of a plastic arcuate magazine track 12 provides for a lighter weight machine 10.

The use of a one piece plastic molded pusher member 14 simplifies the construction of the machine and contributes to a reduction in weight of the machine.

The mounting of the magnet 98 within the cavity 96 inside the body 80 of the pusher member 14 protects the magnet 98 and prevents it from falling out of a bore in a prior art metal pusher member when the magnet is pressed into the bore and over time works its way loose.

The two bolt 38 mounting of the pneumatic cylinder 106 provides a secure and nonadjustable mounting of the arcuate plastic magazine track 12 to the pneumatic piston and cylinder mechanism 35. In prior art machines, a bracket with an elongate mounting hole for a bolt is provided, since repeated intermittent pressure stresses on the prior art metal magazine track caused the bracket to move relative to the bolt.

The pivot connection, boss 58 and bolt 66, to the stationary anvil 64 and to the sidewalls 24, 25 of the housing 23 enables hammer forces exerted by the driver blade 30 on the stationary anvil 64 to absorbed by the lower end 22 of the plastic magazine track 12 causing it to flex slightly. Such forces reach 3,000 pounds per square inch each time a clip is clamped around adjacent wires in an innerspring assembly.

The figure B mounting holes 71–74 allow the guide structure 28 to be mounted in two different positions for different size clips.

A unitary piston and piston rod reduces manufacturing and assembly costs.

The use of a return spring 108 instead of a double acting valve and O-rings on the piston rod 110 reduce the down time of repairs to the clip clamping machine 10 and provides for a substantially constant return force for the piston 102 throughout the life of the machine 10. Also, the replacement of O-rings is avoided.

Also, from the foregoing description it will be understood that modifications can be made to the clip clamping machine of the present invention without departing from the teachings of the invention. Accordingly, the scope of the invention is only to be limited as necessitated by the accompanying claims.

I claim:

1. In a clip clamping machine comprising a clip dispensing and clamping mechanism, a pneumatic piston and cylinder mechanism mounted to a first end of the clip dispensing and clamping mechanism, a magazine track mounted to a second end of the clip dispensing and clamping mechanism and a pusher member in the magazine track, the improvement residing in: said pusher member being a one piece plastic pusher member and including (a) a generally rectangular body that is received in a U-shaped trough of said magazine track, (b) a flange extending laterally from said body and a cage structure mounted to said flange and disposed above one side flange of said magazine track for receiving one end of a coiled spring, said generally rectangular body having a cavity therein adjacent a front end thereof for receiving a magnet for holding the last clip in a line of clips received in said U-shaped trough of said magazine track.

2. In a clip clamping machine comprising a clip dispensing and clamping mechanism, a pneumatic piston and cylinder mechanism mounted to a first end of the clip dispensing and clamping mechanism, a magazine track mounted to a second end of the clip dispensing and clamping mechanism and a pusher member in the magazine track, the improvement residing in: said pusher member being a one piece plastic pusher member and including (a) a generally rectangular body that is received in a U-shaped trough of said magazine track, (b) a flange extending laterally from said body and a cage structure mounted to said flange and disposed above one side flange of said magazine track for receiving one end of a coiled spring, said generally rectangular body having a slot for receiving a spring biased detent member which has a detent that is releasably received in an opening in a bottom wall of said U-shaped trough of said magazine track.

3. In a clip clamping machine comprising a clip dispensing and clamping mechanism including a housing having two elongate spaced apart sidewalls, a pneumatic piston and cylinder mechanism mounted to a first end of the clip dispensing and clamping mechanism, a magazine track mounted to a second end of the clip dispensing and clamping mechanism a pusher member in the magazine track, and a driver blade mounted for reciprocating movement transversely of a path of movement clips in the clip clamping machine, the improvement residing in: said sidewalls of said housing each having a pair of spaced apart figure B shaped mounting openings, each figure B shaped opening being aligned with a figure B shaped opening in the opposed sidewall for providing two mounting positions for a guide structure for the driver blade.

* * * * *

UNITED STATES PATENT AND TRADEMARK OFFICE

CERTIFICATE OF CORRECTION

PATENT NO. : 5,661,899
DATED : September 2, 1997
INVENTOR(S) : Donald B. Ayres

It is certified that error appears in the above-indentified patent and that said Letters Patent is hereby corrected as shown below:

In the Abstract of the Disclosure, cancel "The magazine track is made of thermoplastic material to reduce the weight of the machine. Likewise, the pusher member is a one piece plastic pusher member".

In the Abstract of the Disclosure, last line after "housing." add --The pusher member is a one piece plastic pusher member including (a) a generally rectangular body that is received in a U-shaped trough of the magazine track, (b) a flange extending laterally from the body and a cage structure mounted to the flange and disposed above one side flange of the magazine track for receiving one end of a coiled spring. The generally rectangular body has a cavity therein adjacent a front end thereof for receiving a magnet for holding the last clip in a line of clips received in the U-shaped trough of the magazine track.--

Signed and Sealed this

Eleventh Day of November, 1997

*Attest:*

BRUCE LEHMAN

*Attesting Officer*

*Commissioner of Patents and Trademarks*